(12) United States Patent
Morgan

(10) Patent No.: US 8,815,086 B2
(45) Date of Patent: *Aug. 26, 2014

(54) FLUID FILTER ASSEMBLY

(75) Inventor: H. William Morgan, Centre Hall, PA (US)

(73) Assignee: Pall Corporation, Port Washington, NY (US)

( * ) Notice: Subject to any disclaimer, the term of this patent is extended or adjusted under 35 U.S.C. 154(b) by 1188 days.

This patent is subject to a terminal disclaimer.

(21) Appl. No.: 11/858,315

(22) Filed: Sep. 20, 2007

(65) Prior Publication Data

US 2008/0011669 A1 Jan. 17, 2008

Related U.S. Application Data

(63) Continuation of application No. 10/972,976, filed on Oct. 25, 2004, now abandoned.

(51) Int. Cl.
| | | |
|---|---|---|
| *B01D 35/30* | (2006.01) | |
| *B01D 35/00* | (2006.01) | |
| *B01D 35/143* | (2006.01) | |
| *B01D 29/11* | (2006.01) | |
| *B01D 29/25* | (2006.01) | |
| *B01D 29/27* | (2006.01) | |

(52) U.S. Cl.
CPC .......... *B01D 29/27* (2013.01); *B01D 2201/301* (2013.01); *B01D 2201/4015* (2013.01); *B01D 2201/304* (2013.01); *B01D 2201/4084* (2013.01); *B01D 35/143* (2013.01); *B01D 2201/4046* (2013.01)
USPC ........... 210/232; 210/435; 210/450; 210/451; 210/452; 210/455; 210/477

(58) Field of Classification Search
None
See application file for complete search history.

(56) References Cited

U.S. PATENT DOCUMENTS

| | | | |
|---|---|---|---|
| 3,959,137 A | 5/1976 | Kirsgalvis | |
| 4,133,769 A * | 1/1979 | Morgan, Jr. .................. | 210/455 |
| 4,204,966 A * | 5/1980 | Morgan, Jr. .................. | 210/455 |
| 4,669,167 A * | 6/1987 | Asterlin ....................... | 29/426.6 |
| 5,071,552 A | 12/1991 | Bikson et al. | |
| 5,192,424 A * | 3/1993 | Beyne et al. .................... | 210/85 |
| 5,376,271 A | 12/1994 | Morgan, Jr. | |
| 5,840,188 A * | 11/1998 | Kirsgalvis ..................... | 210/448 |
| 5,989,421 A * | 11/1999 | Davis et al. ................... | 210/232 |
| 6,524,477 B1 * | 2/2003 | Hughes ........................ | 210/282 |
| 6,716,348 B1 | 4/2004 | Morgan | |
| 2003/0038073 A1 * | 2/2003 | Fall et al. ...................... | 210/315 |

FOREIGN PATENT DOCUMENTS

GB 1 441 269 6/1976

* cited by examiner

*Primary Examiner* — Benjamin Kurtz
(74) *Attorney, Agent, or Firm* — Leydig, Voit & Mayer, Ltd.

(57) ABSTRACT

A fluid filter assembly prevents the filter from moving when fluid is not flowing through the filter. The filter assembly of the invention includes a mounting ring mountable in the filter opening. The mounting ring has a mounting interface, which includes an axially extending portion and a radially outwardly extending flange that has a diameter greater than the filter opening. A rib extends radially outwardly from and circumscribes the ring. The rib is seatable within an annular groove defined within the filter housing and circumscribing the filter opening. When the rib is positioned in the groove, the filter is releasably secured in the opening.

9 Claims, 4 Drawing Sheets

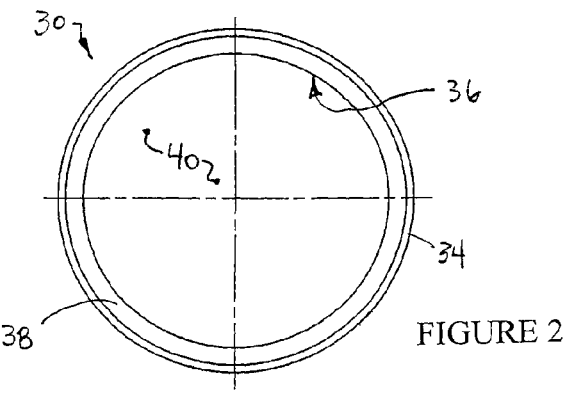
FIGURE 2
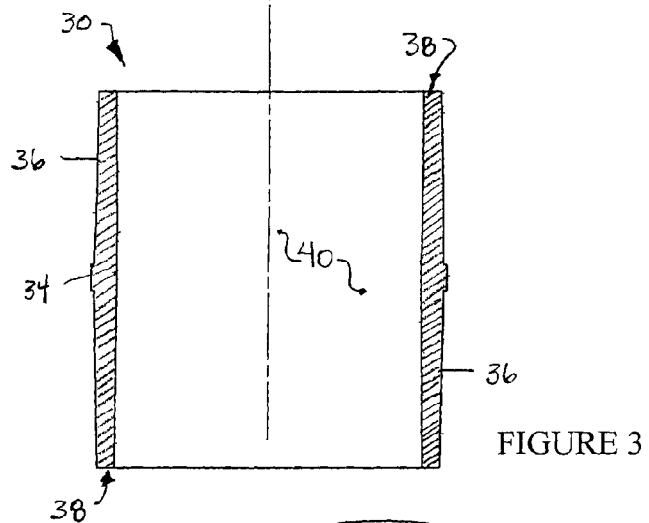
FIGURE 3
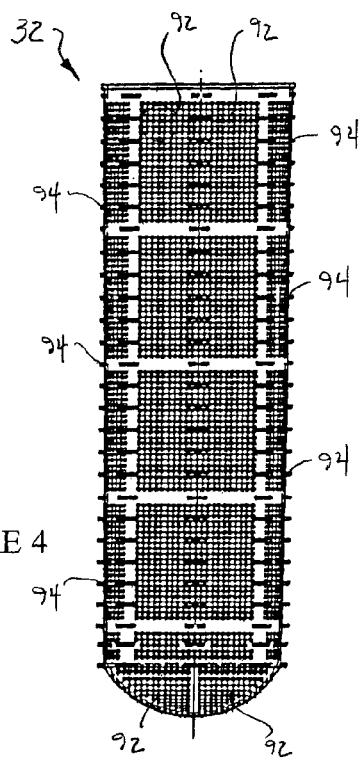
FIGURE 4
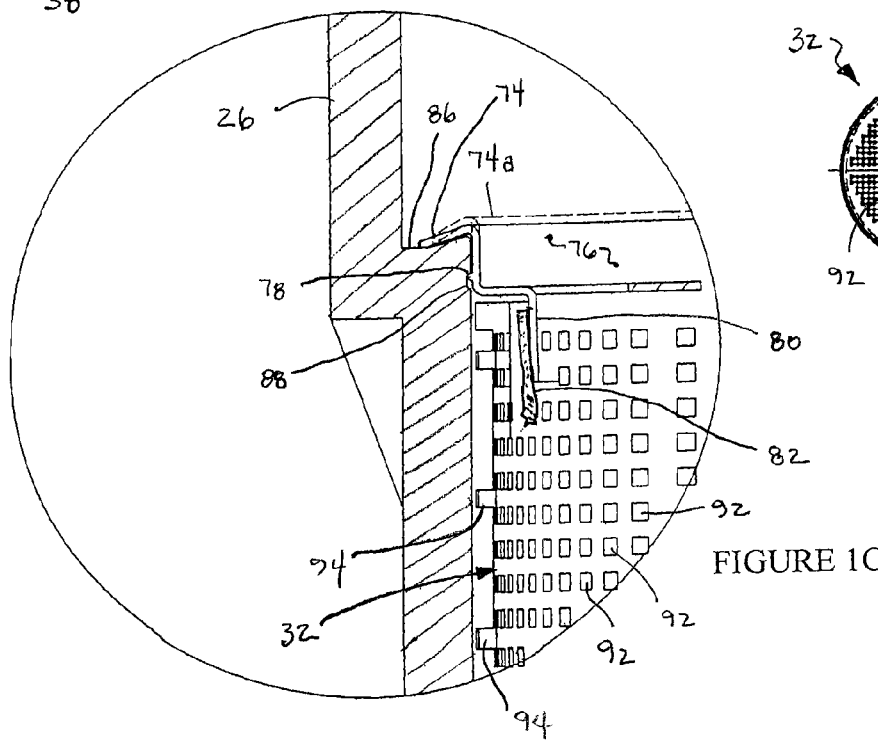
FIGURE 5
FIGURE 1C

FLUID FILTER ASSEMBLY

REFERENCE TO RELATED APPLICATIONS

This is a continuation of application Ser. No. 10/972,976, filed Oct. 25, 2004 now abandoned, the disclosure of which is hereby incorporated by reference, and is entitled to the filing date of that application.

TECHNICAL FIELD OF THE INVENTION

This invention relates generally to fluid filters and, more particularly, to a filter assembly for a fluid filter.

BACKGROUND OF THE INVENTION

Fluid filters have many manufacturing and processing applications. For example, fluid filters are often used in chemical applications, water applications, paints and coatings applications, plastics and resin applications, electronics and semiconductor applications, utilities and power generation applications, food and beverage applications and pharmaceutical applications.

Conventional fluid filters include a filter housing which receives a removable filter element that is used to trap and remove particulates and other matter in the fluid between the filter's intake and outlet. The filter elements typically take the form of either a filter cartridge or a filter bag. Such elements are held in position within the housing and function sufficiently without incident during operation when fluid flows through the filter. Despite the individual circumstances of each application, however, the filter tends to move or float out of position in the housing when there is no fluid flowing through the filter. The force of the flow is necessary to hold conventional filters in position within the housing.

There is a need, therefore, for an improved fluid filter that is removably securable in the housing so that it does not move during down time when fluid is not flowing through the filter and which can be conveniently removed for any reason and replaced when needed. The present invention is directed toward meeting this need.

SUMMARY OF THE INVENTION

The present invention relates to a filter assembly for a fluid filter. The fluid filters of the type contemplated by the invention typically include a filter element, housing, an inlet and an outlet. Such filter assemblies generally include at least one housing section disposed between the inlet and the outlet communicating fluid from the inlet to the outlet, and the filter housing typically defines a filter opening. The filter assembly of the invention includes a mounting ring mountable in the filter opening. The mounting ring includes a mounting interface, and the mounting interface has an axially extending portion and a radially outwardly extending flange. The diameter of the flange is greater than the filter opening.

In one aspect, the axially extending portion of the mounting ring includes an annular rib extending radially outwardly from the annular rib. The rib is seatable within an annular groove defined within the filter housing.

In another aspect, the ring is contiguous with a portion of the filter housing surrounding the filter opening when the rib is seated within the groove.

In yet another aspect, the rib circumscribes the axially extending portion of the mounting ring. The groove formed in said filter housing may likewise circumscribe the filter opening.

One object of the present invention is to provide an improved fluid filter element that is removably securable in the housing so that it does not move when there is no fluid flow in the housing, and which can be conveniently removed for any reason and replaced when needed. Related objects and advantages of the present invention will be apparent from the following description.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1C is a detail view of the fluid filter assembly of FIG. 1 similar to FIG. 1B and further illustrating the method of attaching the filter element;

FIG. 2 is a top view of a modular housing section;

FIG. 3 is a sectional view of the modular housing section taken along line 2-2 of FIG. 2;

FIG. 4 is a side view of a filter basket;

FIG. 5 is an end view of the filter basket of FIG. 4;

Figures 1, 1A, 1B:
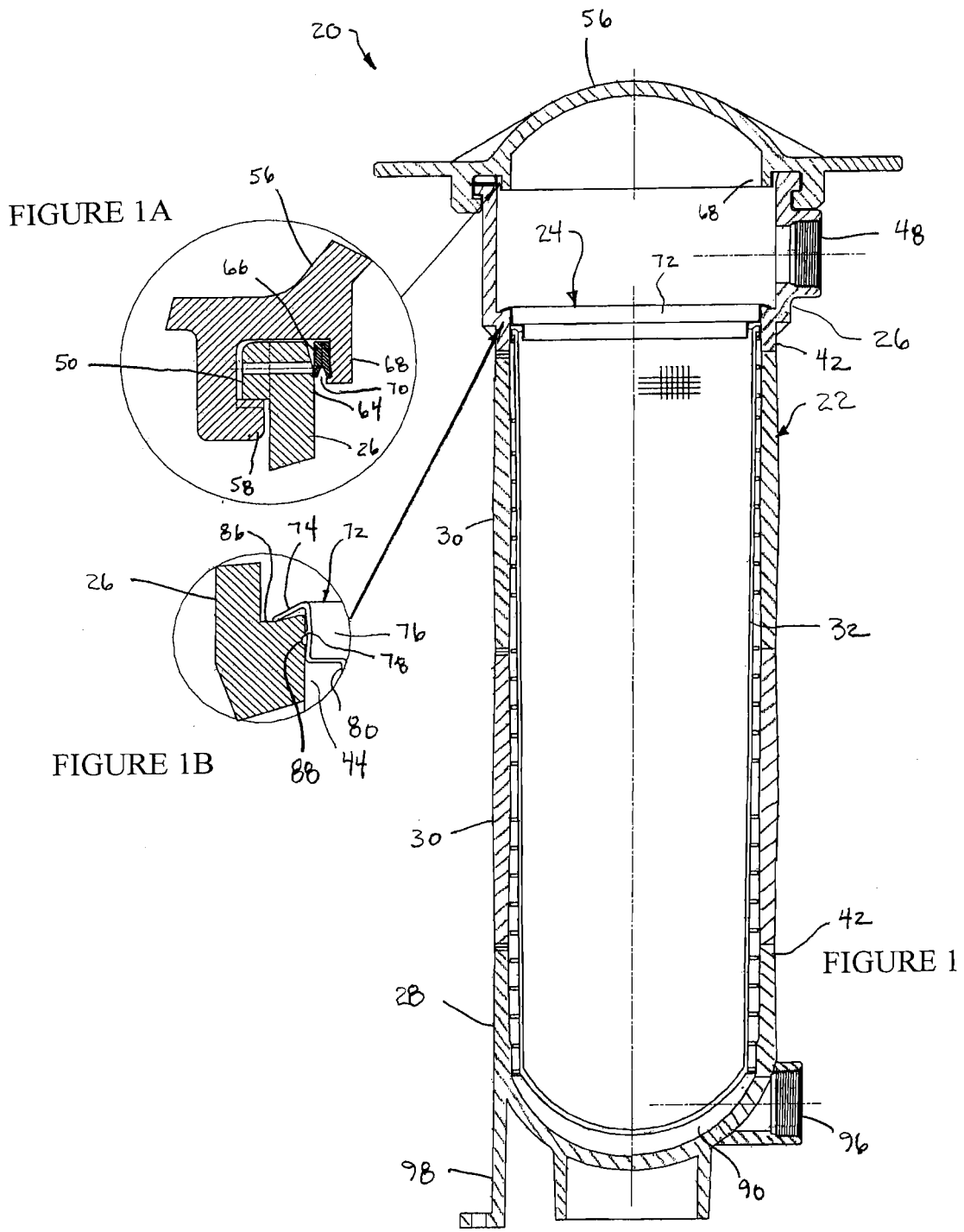
FIG. 1 is a sectional view of a fluid filter assembly in accordance with the present invention.
FIG. 1A is a detail view of the fluid filter assembly of FIG. 1 showing the attachment of the cap.
FIG. 1B is a detail view of the fluid filter assembly of FIG. 1 illustrating the method of attaching the filter element.
Figure 6:
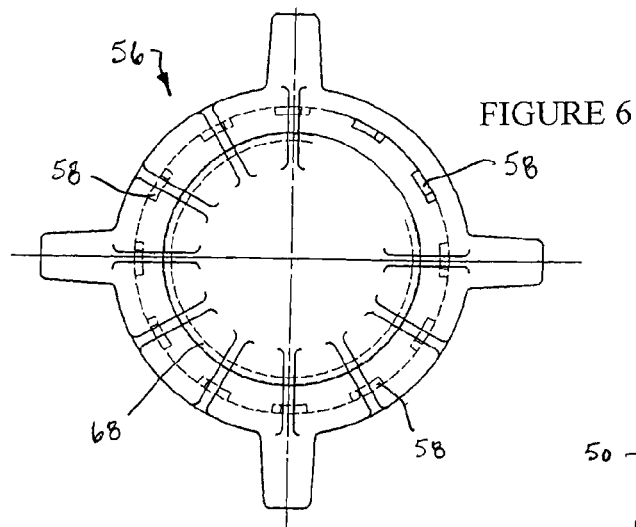
FIG. 6 is a top view of the fluid filter cap.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION OF INVENTION

A modular fluid filter assembly 20 in accordance with the present invention is shown in FIG. 1. Filter assembly 20 includes a filter housing 22 and a filter element 24. Filter housing 22 includes an inlet housing section 26, an outlet housing section 28 and modular housing sections 30. In the illustrated embodiment, filter element 24 is a bag filter and is located within filter basket 32. Cartridge filter elements may also be employed with alternative embodiments of the present invention. In the filter assembly 20 illustrated in FIG. 1, two modular housing sections 30 are disposed between inlet housing section 26 and outlet housing section 28. An alternative number of modular housing sections 30 may also be used as discussed in greater detail below.

An individual modular housing section 30 is shown in FIGS. 2 and 3. As can be seen in these two figures, modular housing section 30 is substantially cylindrical. An outwardly extending ring 34 is located on the outer surface of housing section 30 at the longitudinal midpoint of housing section 30. Sidewalls 36 of housing section are slightly tapered, having a greater thickness near ring 34 and a smaller thickness near the opposing ends 38 of housing section 30. The tapering of sidewalls 36 facilitates their release from a mold during manufacture of modular housing sections 30. The interior surface of sidewalls 36 defines an interior cylindrical cavity 40.

Modular housing sections 30 are joined end-to-end and co-axially. In other words, ends 38 of adjacent housing sections 30 are abutted together during assembly of filter housing 22. The ends 38 of adjacent housing sections 30 form a fluid tight seal therebetween and the abutted ends 38 may be joined by welding. For example, in the illustrated embodiment, housing sections 30 are formed of polypropylene with 20% glass fiber fill and adjacent housing sections 30 are welded together by interposing a hot plate between the two ends 38 to be joined and, after the ends 38 have been sufficiently heated, removing the plate and biasing the two ends 38 together so that they are fused together as they cool. Ends 38 may also be joined together by spin welding or any other suitable method for forming a fluid tight joint.

As described above, opposing ends 38 of each modular housing section 30 have the same configuration. Thus, regardless of the number of modular housing sections 30 located between the inlet housing section 26 and the outlet housing section 28, the joined housing sections 30 will have two opposing ends 38 that can be respectively joined to inlet housing section 26 and outlet housing section 28. Inlet and outlet housing sections 26, 28 each have an assembly interface 42 that takes the form of a cylindrical wall defining an opening 44. Assembly interfaces 42 have the same configuration as ends 38 and inlet and outlet housing sections 26, 28. Inlet and outlet sections 26, 28 are also formed of polypropylene with 20% glass fiber fill. Consequently, the assembly interfaces 42 of inlet and outlet sections 26, 28 can be joined to an end 38 of a modular housing section 30 in the same manner as ends 38 of separate modular housing sections 30 are joined together.

Figure 8:
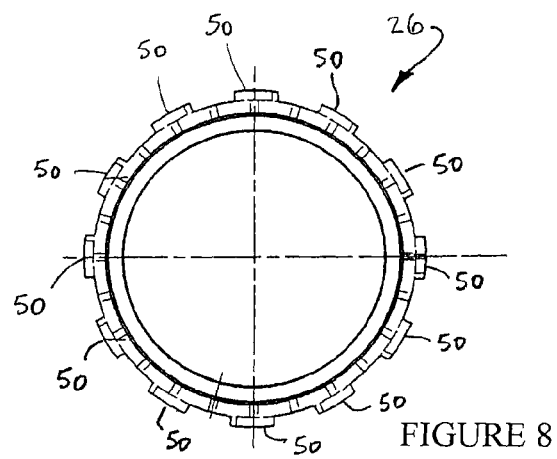
FIG. 8 is a top view of the inlet housing section.
Figure 7:
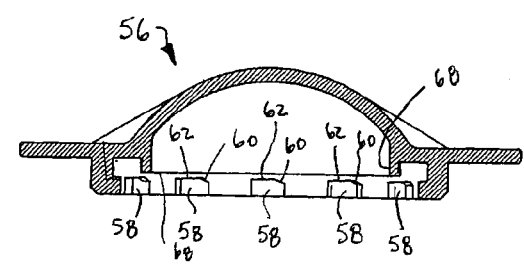
FIG. 7 is a sectional view of the cap taken along line 7-7 of FIG. 6.
Figure 9:
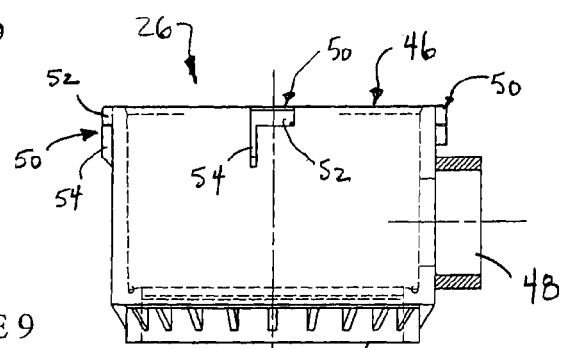
FIG. 9 is a side view of the inlet housing section of FIG. 8.
Figure 10:
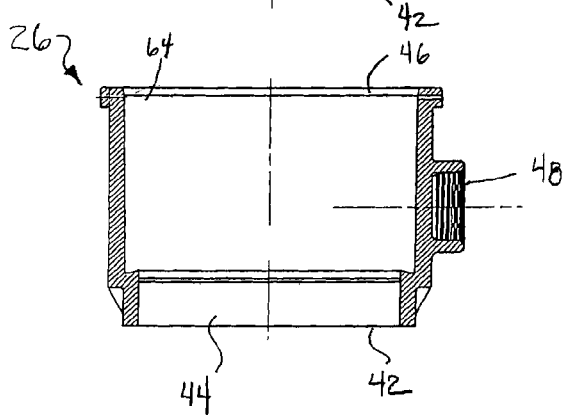
FIG. 10 is a sectional view of the inlet housing section taken along line 10-10 of FIG. 8.

Inlet housing section 26 of assembly 20 is shown in FIGS. 8, 9 and 10 and includes an access opening 46 located coaxially and opposite opening 44. Inlet housing section 26 also includes a threaded inlet opening 48 that is joined to a fluid line to receive the fluid that is to be filtered by filter assembly 20. As best seen in FIGS. 8 and 9, a camming interface for securing cap 56 to inlet housing section 26 includes a series of cam locking members 50 are located on the outer surface of generally cylindrical inlet housing section 26. Cam locking members 50 include a circumferentially extending locking portion 52 and a longitudinally extending stop 54. Cap 56 includes a plurality of cooperating cam locks 58 that extend circumferentially along the inner surface of cap 56. Cam locks 58 each include an inclined surface 60 and a locking surface 62. When mounting cap 56 to inlet housing section 26, cam locks 58 fit between locking members 50 as cap 56 is longitudinally mounted on inlet housing section 26. Rotation of cap 56 engages each inclined surface 60 with one of the locking members 50 on inlet housing section 26. As cap 56 is rotated, locking surfaces 62 are rotated into engagement with locking portions 52 to tightly engage cap 56 with inlet housing section 26. As cap 56 is further rotated, cam locks 58 engage stops 54 which thereby prevent the over-rotation of cap 56.

A V-shaped gasket 66 (FIG. 1A) is used to form a fluid tight seal between cap 56 and inlet housing section 26. Gasket 66 is located between the inner radial surface 64 of inlet housing 26 that defines access opening 46 and cylindrical lip 68 located on cap 56. Gasket 66 has an open end 70 that faces the interior volume of inlet housing section 26 so that the interior of gasket 66 is in fluid communication with the fluid within filter assembly 20. Consequently, when pressurized fluid is present in filter assembly 20 the fluid will bias the two separate legs of gasket 66 apart and into sealing contact with interior surface 64 and outer radial surface of lip 68 respectively. Inlet housing section 26 includes a vent bore 67 at its upper rim which is sealed by gasket 66 when cap 56 is properly seated. If the cap is not properly seated, liquid will seep from bore 67 when the filter is filled to alert the user.

Filter element 24 is secured by engagement with inlet housing section 26 near assembly interface 42. Filter element 24 has a mounting ring 72 that is removably mounted to inlet housing section 26 in a snap fit engagement. Ring 72 defines a mounting interface that includes an outer radially extending flange 74 and a generally cylindrical section 76 having an outwardly extending annular rib 78 which may be segmented. Ring 72 also includes a second cylindrical mounting section 80 having a smaller diameter. Filter bag 82 is secured to mounting section 80. In the illustrated embodiment, ring 72 is formed of polypropylene. Other materials, however, such as nylon, polyester or steel may also be used to form the mounting ring of a bag-type filter element.

Filter bag 82 is a conventional non-woven felt filter bag. Such filter bags may be formed from fibers of a variety of different materials such as polyester, polypropylene, nylon, nomex, Teflon® or other suitable material as is well known to those having ordinary skill in the art. Filter bag 82 has an open end that is attached to mounting section 80 of ring 72 by ultrasonic welds 84. Stitching or other suitable means may alternatively or additionally be employed to attach bag 82 to ring 72. Bag-type filter elements suitable for use with the present invention are commercially available from Filter Specialists, Inc. having a place of business in Michigan City, Ind. For purposes of clarity, filter bag 82 is not shown in FIG. 1.

When installing filter element 24 in filter housing 22, filter bag 80 is inserted through access opening 46 and opening 44 into the interior volume 40 of modular housing sections 30 until mounting ring 72 engages inlet housing section 26 adjacent opening 44 to secure filter element 24 within assembly 20. The snap-fit securement of mounting ring 72 is best seen in FIGS. 1B and 1C. FIG. 1B illustrates mounting ring 72 immediately prior to its securement. As can be seen in FIG. 1B, outer radial flange 74 forms an acute angle with cylindrical section 76 and as axially-extending portions 80, 76 of ring 72 are inserted further into opening 44, radial flange 74 tightly engages inclined shoulder surface 86 which surrounds opening 44. An annular groove 88 is located within opening 44 and rib 78 is seated within groove 88 to secure mounting ring 72 in place. As illustrated in FIG. 1C, the seating of rib 78 within groove 88 forces outer radial flange 74 relatively upwardly as it engages shoulder surface 86 to thereby form a fluid tight seal between flange 74 and shoulder surface 86. The dashed line 74a shown in FIG. 1C illustrates the position of radial flange 74 in an unbiased condition.

Ring 72 may also be provided with internal handles (not shown) that extend generally diametrically across ring 72 to allow ring 72 to be more easily flexed radially inwardly during insertion and removal of ring 72. Such handles are disclosed in U.S. Pat. No. 4,669,167 which is hereby incorporated herein by reference.

A reticulated filter basket 32 may optionally be employed with the present invention when using a bag-type filter element. Filter basket 32 has a length that corresponds to the length of the filter bag and is used to prevent the filter bag from engaging the interior surface of the filter housing during filtering operations. Filter basket 32 is positioned within the filter volume defined by modular housing sections 30 and rests upon ribs 90 located within outlet housing section 28. Filter basket 32 has a generally perforated structure defining fluid openings 92 over the majority of its surface area as best seen in FIGS. 4 and 5 with protrusions 94.

During filtering operations, fluid enters filter assembly 20 through inlet 48 and then passes through ring 72 and opening 44 and into filter bag 82. The fluid then passes through bag 82. As the fluid passes through bag 82, the fluid is filtered and particulates removed from the fluid. The filtered fluid then passes through openings 92 in filter basket 32. The filtered fluid flows between filter basket 32 and the interior surface of filter housing 22 towards threaded outlet opening 96 in outlet housing section 28 where it exits filter assembly 20.

Figure 11:
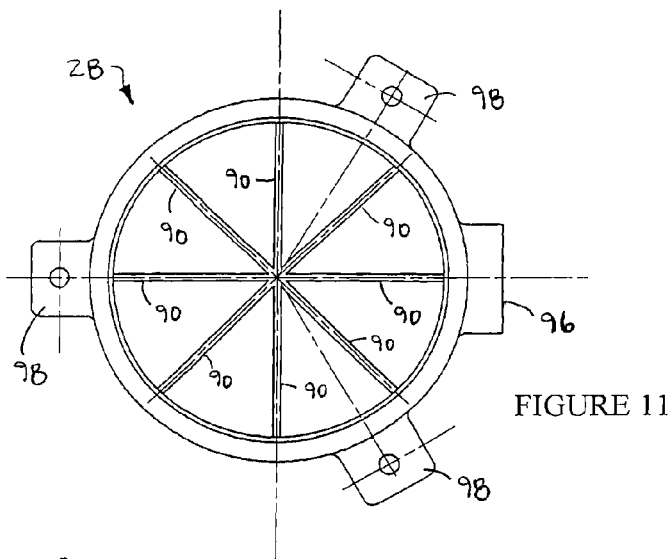
FIG. 11 is a top view of the outlet housing section.
Figure 12:
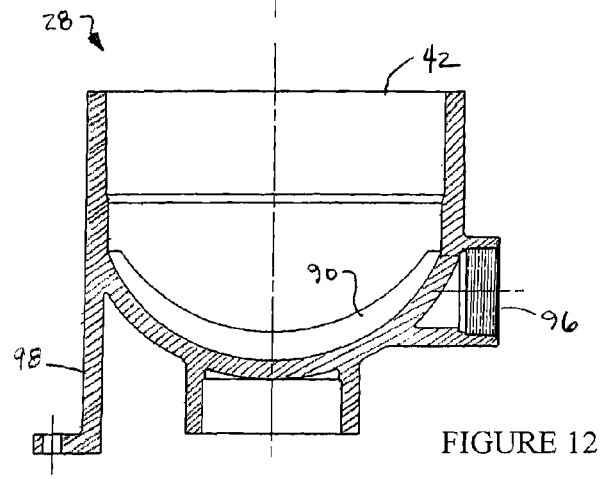
FIG. 12 is a sectional view of the outlet housing section taken along line 12-12 of FIG. 11.

Outlet housing section 28 is shown in FIGS. 11 and 12 and includes three feet 98 for supporting filter assembly 20 in a vertical orientation. Ribs 90 located within the interior volume of outlet housing section 28 are best seen in FIG. 11.

Figure 13:
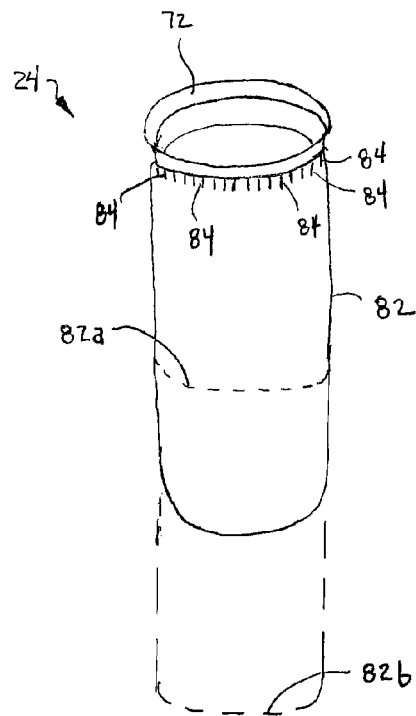
FIG. 13 is a perspective view of a filter element.

A bag-type filter element 24 is illustrated in FIG. 13. In the illustrated filter element 24, filter bag 82 has a length that corresponds to the filter cavity 40 defined by the use of two modular housing sections 30 as depicted in the fluid filter assembly 20 of FIG. 1. Dashed lines 82a and 82b indicate the length of two alternatively sized filter elements. In each case, the differently sized bag-type filter elements would employ a mounting ring 72 having the same configuration whereby each of the bags could be mounted, using the snap-fit securement method described above, in an inlet housing 26.

Figure 14:
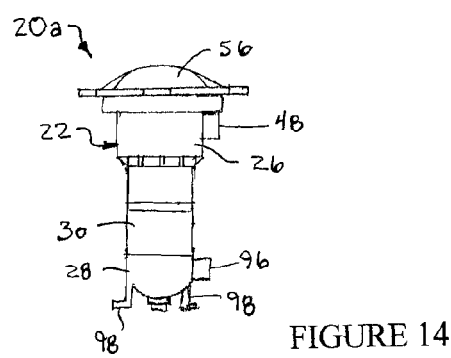
FIG. 14 is a side view of another fluid filter assembly.

As described above, modular housing sections 30 each have the same configuration and are coaxially securable to thereby define a filter cavity 40 having a length that varies depending upon the number of modular housing sections 30 joined together. Thus, when it is desired to manufacture a fluid filter that employs a filter element with a bag having a length 82a, the filter housing is constructed using only a single modular housing section 30 as depicted in FIG. 14. The fluid filter assembly 20a shown in FIG. 14 thereby defines a filter cavity 40 having a length suited for use with the selected filter element. Similarly, when it is desired to manufacture a fluid filter that employs a filter element with a bag having a length 82b, the filter housing is constructed using three modular housing sections 30 to thereby define a filter cavity 40 having an appropriate length.

The present invention thereby facilitates the efficient manufacture of filter housings for a variety of differently sized filter elements. Each of the filter housings will employ an inlet housing section 26, in which each of the different filter elements can be removably mounted, an outlet housing section 28, and one or more modular housing sections 30. The number of modular housing sections being determined by the size of the filter element with which the filter housing is intended to be used.

While this invention has been described as having an exemplary design, the present invention may be further modified within the spirit and scope of this disclosure. This application is therefore intended to cover any variations, uses, or adaptations of the invention using its general principles.

What is claimed is:

1. A fluid filter assembly of the type having a filter element and a filter housing, wherein the filter housing includes an inlet, an outlet, at least one housing section disposed between the inlet and the outlet and communicating fluid from the inlet to the outlet, wherein said filter housing includes a shoulder surface which defines a filter opening, the filter element including a mounting ring mounted in said filter opening, said mounting ring having a mounting interface, said mounting interface including an axially extending portion and a radially outwardly extending flange having a diameter greater than said filter opening so as to overlie said shoulder surface, said axially extending portion of said mounting ring including an annular rib extending radially outwardly therefrom and spaced from said flange in the direction of said outlet; said rib seated upon unidirectional axial insertion of the filter element into the filter housing toward said outlet within an annular groove defined within said filter housing and located between said shoulder surface and said outlet to thereby secure said axially extending portion of said mounting ring within said filter opening with said flange contacting said shoulder surface.

2. The assembly according to claim 1, wherein said mounting ring being contiguous with a portion of said filter housing surrounding said filter opening when said rib is seated within said groove.

3. The assembly according to claim 1, wherein said rib circumscribes said axially extending portion of the mounting ring.

4. The assembly according to claim 3, wherein said groove formed in said filter housing circumscribes said filter opening.

5. The assembly according to claim 4, wherein said mounting ring being contiguous with a portion of said filter housing surrounding said filter opening when said rib is seated within said groove.

6. The assembly according to claim 1, wherein said flange is in biased contact with said shoulder surface.

7. The assembly according to claim 6, wherein said is rib seated within said groove thereby retaining said flange against said shoulder.

8. The assembly according to claim 7, wherein said flange forms a tight seal with said shoulder.

9. The assembly according to claim 8, wherein said flange is down-turned and outwardly directed from said axially extending portion, said flange contacting said shoulder.

* * * * *